Figure 1:
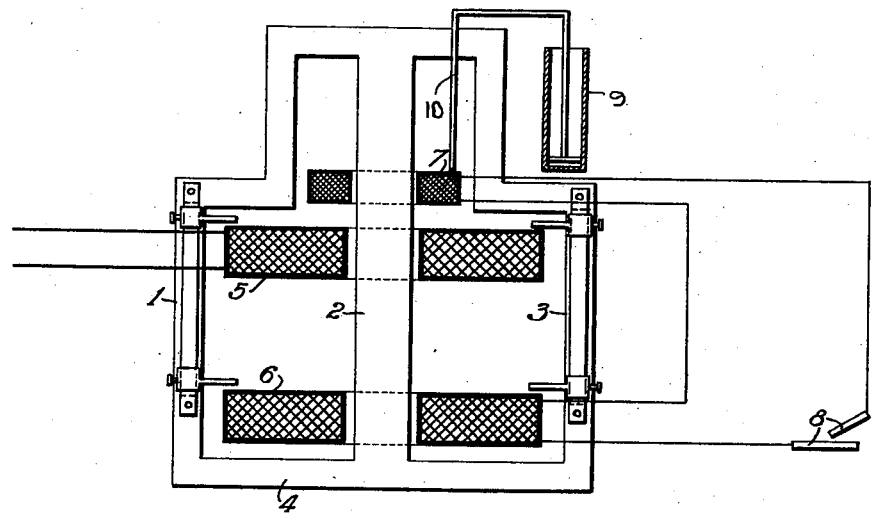

O. H. ESCHHOLZ AND H. FAHNOE.
ELECTRIC ARC WELDING SYSTEM.
APPLICATION FILED SEPT. 8, 1919.

1,343,202. Patented June 15, 1920.

WITNESSES:
Geo. D. Barrett
O. E. Bee

INVENTOR
Otto. H. Eschholz &
Hans Fahnoe.
BY
Wesley G. Carr
ATTORNEY

UNITED STATES PATENT OFFICE.

OTTO H. ESCHHOLZ, OF WILKINSBURG, AND HANS FAHNOE, OF PITTSBURGH, PENN-SYLVANIA, ASSIGNORS TO WESTINGHOUSE ELECTRIC AND MANUFACTURING COMPANY, A CORPORATION OF PENNSYLVANIA.

ELECTRIC-ARC-WELDING SYSTEM.

1,343,202.  Specification of Letters Patent.  Patented June 15, 1920.

Application filed September 8, 1919. Serial No. 322,301.

*To all whom it may concern:*

Be it known that we, OTTO H. ESCHHOLZ, a citizen of the United States, and a resident of Wilkinsburg, in the county of Allegheny and State of Pennsylvania, and HANS FAHNOE, a citizen of the United States, and a resident of Pittsburgh, in the county of Allegheny and State of Pennsylvania, have invented a new and useful Improvement in Electric-Arc-Welding Systems, of which the following is a specification.

Our invention relates to electric-arc welding systems and, more particularly, to transformers which may be incorporated in alternating-current welding systems. The primary object of our invention is to improve the starting characteristics of alternating-current welding systems.

It has been found feasible to weld by means of alternating current, but some difficulty has been experienced in welding systems of such character because it is difficult to draw an arc when alternating current is utilized. The difficulty encountered in establishing an arc is believed to be occasioned by the reversals of current which tend to create unstabilized conditions. We have found, however, that an arc may be more easily established by means of alternating current if a relatively high voltage is employed during the period of establishing the arc. The relatively high value of voltage may be subsequently reduced to a desirable operating value after the arc has been established.

One object of our invention, therefore, resides in the provision of a transformer which may be incorporated in an alternating-current welding system and which shall function to automatically provide a relatively high voltage between the electrodes under starting conditions, and which shall automatically reduce the starting voltage to a suitable arc-sustaining value.

Another object of our invention is to construct a transformer which may be directly connected to a supply circuit and to a plurality of electrodes to thus provide a complete welding system.

With these and other objects in view, our invention will be more fully described, illustrated in the drawings, in the several views of which corresponding numerals indicate like parts, and then particularly pointed out in the claims.

Figure 2:
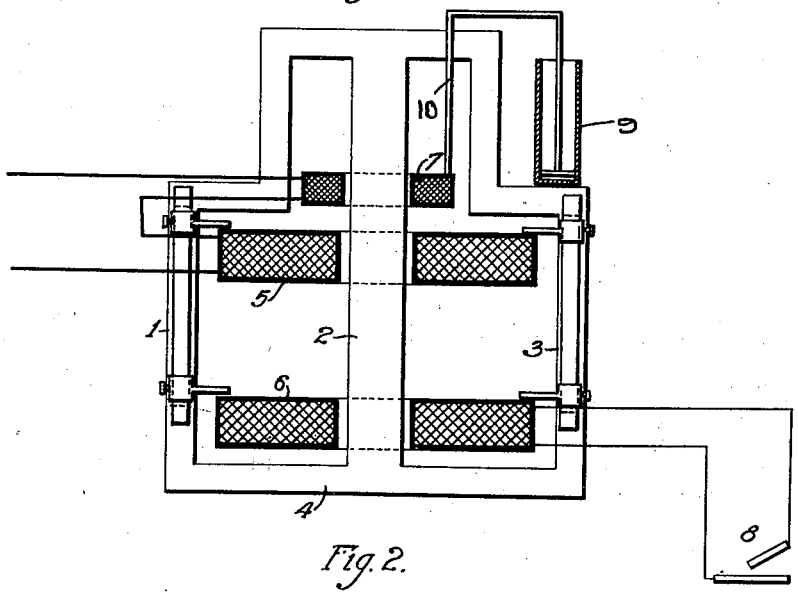

In the drawings, Figure 1 is a diagrammatic view of a transformer connected to a plurality of electrodes to provide a welding system in accordance with our invention, and Fig. 2 is a similar view illustrating a modification of our invention.

In practising our invention, we may provide an alternating-current welding system by employing a transformer of the constant-current type. The transformer is, of course, provided with a plurality of windings comprising a primary and a secondary winding, which may be adjustably mounted upon the core of the transformer to permit of regulation of the current drawn in the welding system. We may employ an auxiliary winding, which may be connected in series with either the primary or the secondary winding, which shall function to automatically increase the voltage available between the electrodes under starting conditions and to automatically reduce the starting voltage to a desirable operating value when an arc has been established between the electrodes. The auxiliary winding, employed in this manner, also acts as a stabilizing means in the arc circuit.

In Fig. 1, is shown a transformer comprising a core member formed with three legs, 1, 2 and 3. The central leg 2 is of substantially the same cross-sectional area as the combined sectional areas of the outer legs 1 and 3, all of which are connected, at one end, by a straight member 4. The other end of the core member has its outer legs 1 and 3 so formed as to provide restricted openings between the outer legs and the central leg 2. A primary winding 5 and a secondary winding 6 may be so mounted about the central leg 2 that they may be adjusted relative to each other to vary the current drawn from the secondary winding 6. An auxiliary winding 7 may be so mounted about the central leg 2, preferably above the primary and the secondary windings, as to permit of its movement into the restricted portions of the core member. The primary winding 5 is provided with suitable means to permit of its being connected to a supply circuit, and the secondary winding 6 is connected to a plurality of electrodes 8 and in series with the auxiliary winding 7.

In order to perform a welding operation, the primary winding 5 may be adjusted, relative to the secondary winding 6, to provide for the value of current to be drawn from the secondary winding which is suitable for the character of work to be performed and the primary winding may then be connected to the supply circuit. The auxiliary winding 7, under open-circuit conditions, engages the primary winding 5 and is, therefore, in its closest position with respect to the secondary winding 6. When the electrodes 8 are engaged, preliminary to establishing an arc, the voltage available therebetween is a result of the usual inductive action between the primary and the secondary windings, and this voltage is raised or supplemented by the action of the auxiliary winding 7. The auxiliary winding 7 is repelled from the winding 5 when current flows in the secondary circuit and, on account of being moved farther away from the secondary winding 6, it tends to reduce the voltage available between the electrodes.

It will be appreciated, from the foregoing description, that the auxiliary winding automatically varies the voltage between the electrodes to insure a relatively high starting voltage, which is shortly reduced to a desirable operating value. When the auxiliary winding 7 is repelled from the primary winding 5 and an arc is established between the electrodes, operating conditions are established and the auxiliary winding then acts as a reactance and tends to create stable conditions in the welding circuit. It is, therefore, an advantage, not only in improving the starting characteristics, but also in stabilizing the arc to improve operating conditions.

In Fig. 2 is shown a modification of our invention in which the auxiliary winding 7 is connected in series with the primary winding 5, and the secondary winding 6 is directly connected to the electrodes 8. The same principle of operation obtains in the modified form of our invention as that in the system shown in Fig. 1.

For example, in operation, the windings 5 and 6 are adjusted relative to each other to obtain a suitable welding current when they are energized and the auxiliary winding 7 engages the primary winding 5. The auxiliary winding and the primary windings are connected to a suitable supply circuit, and, when the electrodes are engaged, the auxiliary winding 7 establishes a flux which opposes the flux developed by the primary winding 5 and produces substantially the same effect as would be obtained by connecting only a portion of the primary turns to the supply circuit; that is, it raises the voltage per turn in the primary winding. The action of the auxiliary winding 7, therefore, results in a higher voltage available across the electrodes which is subsequently reduced because the auxiliary winding 7 is repelled from the primary winding 5 and its opposing action is reduced to a minimum. When the auxiliary winding 7 is repelled from the primary winding 5, the same effect is experienced as if the primary connections were changed to include the total number turns of the winding, thereby reducing the voltage per turn therein. The varying of the voltage in the primary winding, of course, directly effects the voltage in the secondary winding, and therefore, the voltage available across the electrodes. If it is desired to decrease the rate of reduction of the starting voltage, a dashpot 9, or other suitable retarding device, may be connected to the winding 7 to retard its movement from the winding 5 by arranging an arm 10 to engage the winding when it is moved into the end of the core member.

It will be apparent, therefore, that the auxiliary winding again establishes the effect described in the welding system shown in Fig. 1, that is, to insure a relatively high starting voltage which is subsequently reduced to a suitable arc-sustaining value. Furthermore, the auxiliary winding 7, when connected in series with the primary winding, also acts as a reactance, after it has been repelled from the primary winding and tends to create stable conditions in the welding circuit.

It will be appreciated, from the foregoing description of the welding systems, that we have provided, by our invention, a simple and practical alternating-current welding system in which good starting characteristics are embodied that do not require special attention of the operator to insure proper working of the system. Since it is essential that the operator give his entire attention to the production of a good weld, automatic regulation to provide good starting characteristics is, therefore, a distinct advantage. The welding systems above described are compact and do not include any complicated or expensive apparatus and are desirable, therefore, from the standpoint of economy of installation.

Although we have shown and specifically described a plurality of welding systems embodying transformers constructed in accordance with our invention, it is obvious that minor changes may be made in the transformers, particularly in the connection and disposition of the windings, without departing from the spirit or scope of our invention, and we desire, therefore, that no limitations shall be imposed except such as are indicated in the appended claims.

We claim as our invention:—

1. An electric-arc welding system comprising a transformer having primary and secondary windings, a plurality of electrodes connected to the secondary winding and an auxiliary winding connected in series with one of the windings.

2. An electric-arc welding system comprising a transformer having primary and secondary windings, a plurality of electrodes connected to the secondary winding and an auxiliary winding connected in series with the primary winding.

3. An arc welding transformer comprising a core member, primary and secondary windings adjustably mounted thereon and an auxiliary winding connected in series with the primary winding and so mounted upon the core member as to permit of its movement when a current flows in the primary winding.

4. An arc welding system comprising a transformer including a core member, a primary winding mounted thereon and connected to a source of alternating current, a secondary winding mounted upon the core member and connected to a plurality of electrodes and an auxiliary winding connected in series with the primary winding, the auxiliary and primary windings being closely coupled under open-circuit conditions and loosely coupled under closed-circuit conditions.

5. An arc welding transformer comprising a core member formed with three legs, primary and secondary windings adjustably mounted about the central leg of the core member and an auxiliary winding mounted upon the central leg of the core member above the other windings and connected in series with one of the windings.

6. An arc welding transformer comprising a core member formed with three legs, primary and secondary windings adjustably mounted about the central leg of the core member and an auxiliary winding so mounted upon the central leg of the core member above the other windings as to be free to move and connected in series with one of the windings.

7. In an arc welding system, the combination with a transformer having primary and secondary windings and a plurality of electrodes connected in series with the secondary winding, of an auxiliary winding so mounted and connected as to supplement the voltage in the secondary winding when the electrodes are in engagement and to reduce the voltage when an arc is drawn between the electrodes.

In testimony whereof, we have hereunto subscribed our names this 2nd day of Sept., 1919.

OTTO H. ESCHHOLZ.
HANS FAHNOE.